United States Patent [19]

Briefer

[11] Patent Number: 4,464,725
[45] Date of Patent: Aug. 7, 1984

[54] TEMPERATURE COMPENSATED MEASURING SYSTEM

[75] Inventor: Dennis K. Briefer, Berlin, Mass.
[73] Assignee: Setra Systems, Inc., Acton, Mass.
[21] Appl. No.: 539,227
[22] Filed: Oct. 6, 1983

Related U.S. Application Data

[63] Continuation of Ser. No. 265,088, May 19, 1981.

[51] Int. Cl.³ ............. G01G 19/413; G01G 23/365; G06F 15/20
[52] U.S. Cl. .................. 364/571; 364/466; 364/567; 177/25
[58] Field of Search ........... 364/557, 558, 567, 568, 364/571, 466; 177/25, 211, 226

[56] References Cited

U.S. PATENT DOCUMENTS

| | | | |
|---|---|---|---|
| 3,788,134 | 1/1974 | Meier | 177/226 |
| 4,080,657 | 3/1978 | Caldicott et al. | 364/567 |
| 4,139,892 | 2/1979 | Gudea et al. | 177/25 |
| 4,310,893 | 1/1982 | Loshbough | 364/571 |

FOREIGN PATENT DOCUMENTS 1495278 12/1977 United Kingdom .

Primary Examiner—Gary Chin
Attorney, Agent, or Firm—Kenway & Jenney

[57] ABSTRACT

A temperature-compensated measuring system employs an internal signal-processor to provide high accuracy measurements, correct over a wide range of temperatures. In a calibration mode, the system employs the signal-processor to provide mathematical constants used to generate a temperature-compensation function. In a measurement mode, signals representing the uncompensated quantity and the system temperature are supplied to the signal-processor, which uses them to generate a temperature-compensation function from which it produces a high-accuracy temperature-corrected value of the measured quantity. In various forms, the invention can be used to measure temperature-compensated force, pressure or acceleration.

4 Claims, 3 Drawing Figures

TEMPERATURE COMPENSATED MEASURING SYSTEM

REFERENCE TO RELATED APPLICATION

The subject matter of this application is a continuation of U.S. patent application Ser. No. 265,088, Weighing System, filed on May 19, 1981, and incorporated herein by reference.

BACKGROUND OF THE INVENTION

The present invention is in the field of instrumentation, and more particularly, relates to force and pressure measuring systems.

Typical prior art force measuring systems in the form of scales, for example, include a platform, or weighing pan, for receiving the weight to be measured. The weighing pan is coupled by a force transducer to a support member, or frame. In various forms of the prior art sensing systems, the transducer and weighing pan are coupled to the support member by linkages adapted to permit relatively accurate weight sensing for objects in the pan. By way of example, the force sensors might incorporate strain gauges, or a movable coil in a fixed magnetic field in a feedback arrangement.

While the prior art weighing systems do provide a relatively accurate measure of objects placed in the weighing pan, there are a number of shortcomings of the known systems. For example, many such systems are particularly sensitive to off-center loading of the object-to-be-measured in the weighing pan. Such off-center loading may give rise to errors due to frictional losses in the system. To counteract such losses, the prior art scale systems often utilize various forms of mechanical linkages for reducing such errors. For example, U.S. Pat. No. 4,026,416 discloses a flexure arrangement restricting motion of the weighing pan along a single sensing axis. However, such systems are relatively limited in their range of motion and thus the range of weights permitted.

A further disadvantage of many of the prior art systems is variation of those systems with temperature, such as may be due to the temperature effects on the sensing transducer and associated circuitry, as well as temperature variation of the various mechanical assemblies.

Accordingly, it is an object of the present invention to provide a high accuracy and high precision weighing system which is compensated for variations in temperature of the system.

It is another object to provide a pressure measuring system which is compensated for variations in temperature of the system.

SUMMARY OF THE INVENTION

Briefly, the present invention is a temperature compensated measuring system. In a form adapted for weighing an object on a force input member, the system includes a storage device for storing constants $K_{ij}$ used in evaluating temperature-compensated force function $W(F,T)$, where $$W(F,T) = \sum_{i=1}^{m} a_i(T) F^{i-1} \quad (*)$$

where F is a function of the uncompensated input force (i.e. the weight of an object), and T is representative of the temperature of the system and where $$a_i(T) = \sum_{j=1}^{n} K_{ij} T^{j-1}, i = 1, 2, \ldots, m \quad (**)$$

where $K_{ij}$ are constants. The system further includes a generator for generating a sensor signal $F_W$ representative of the input force at the temperature of the system, and a temperature signal generator for generating a temperature signal $F_T$ representative of the temperature of the system. In one form of the invention, these two generators include oscillators in which frequency varies with applied force and temperature, respectively. In this form, the signals $F_W$ and $F_T$ are representative of the respective frequencies of those oscillators.

A force signal generator is responsive to the $F_W$ and $F_T$ signals and the stored constants $K_{ij}$ to generate a signal representative of the temperature-compensated force function $W(F,T)$ evaluated at an input force F corresponding to $F_W$ and at a temperature T corresponding to $F_T$.

With this configuration, the system provides an output signal, i.e., the temperature-compensated force signal, which is representative of the input force, i.e. the weight of the object in the pan.

According to another aspect of the invention, the system includes an apparatus for calibrating the temperature-compensated force function $W(F,T)$. The calibration generator includes a device for generating a succession of sensor signals in response to the application of a succession of m predetermined weights to the weighing pan while the system is at each of n different temperature, $T_1, T_2 \ldots, T_n$, respectively. The calibration generator further includes a device for solving the function $W(F,T)$ for $a_i(T)$ and generating coefficient signals representative of $a_i(T)$ for each of the n temperatures. The function (*) is solved for values of $i=1, 2, \ldots$, and m, and where F corresponds to a respective one of the sensor signals generated at the associated temperature, and where $W(F,T)$ equals the respective weights associated with the sensor signals.

The calibration generator further includes a device for solving equations (**) for $K_{ij}$ and generating signals representative of $K_{ij}$ for each i value. The function $a_i(T)$ is solved for $J=1, 2, \ldots$, and n, where $a_i(T)$ equals the respective one of the coefficient signals associated with the temperatures $T_1, T_2, \ldots, T_n$ and T equals the repsective temperatures associated with those coefficient signals.

In one form of the invention, the device for solving $W(F,T)$ and $a_i(T)$ is a programmed digital computer. In a preferred form, m equals 4 and n equals 3.

In a form of the invention adapted for pressure measurement, the sensor signal generator is adapted to generate a signal $F_W$ which is representative of an input pressure. The temperature-compensated function (*) is the same function of F and T, but F is a function of input pressure.

The present invention, in the force measurement form, is also useful as an accelerator transducer, i.e. where the input force is an inertial force applied to the force input member.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
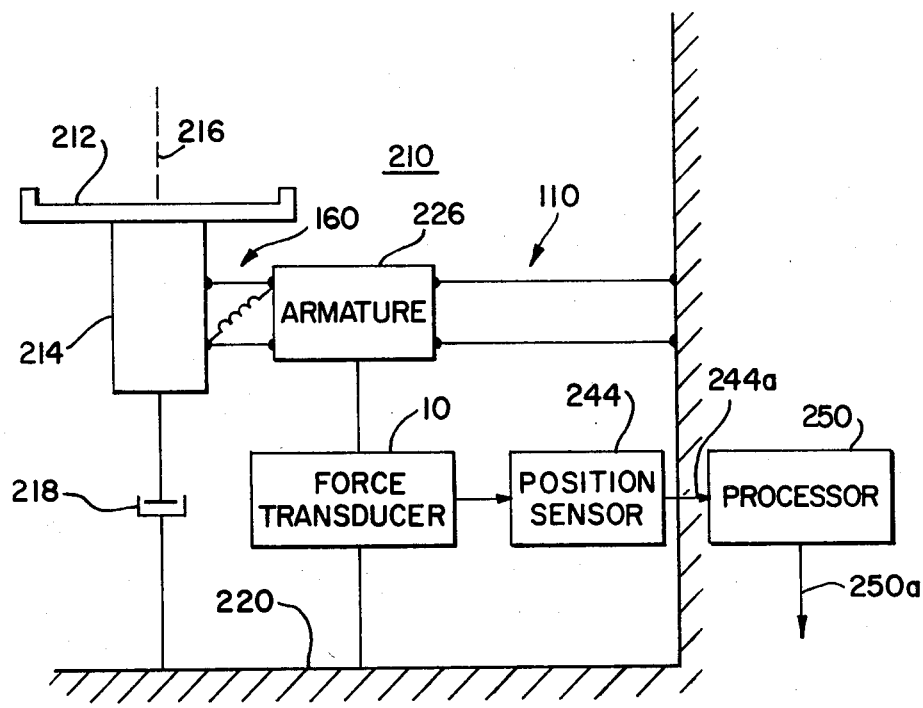
FIG. 1 shows in schematic form a weighing system embodying the present invention.

FIG. 1 shows a schematic representation of a weighing system 210 in accordance with the present invention. That system includes force input member in the form of a weighing pan 212 and associated support post 214 adapted for motion along a reference axis 216. The post 214 is coupled by way of a mechanical damper assembly 218 to a reference member (or housing) 220 which is fixed with respect to axis 216. The pan 212 and its support post 214 are coupled to an armature member 226 by a parallel motion linkage assembly 160. The armature member 226 is coupled by a parallel motion linkage assembly 110 to the support member 220. A force transducer 10 is coupled between the armature member 226 and the support member 220. The transducer 10 is coupled by line 10a to a position sensor 244. Position sensor 244 in turn provides an output signal on line 244a which is representative of the motion of an element of the force transducer 10 which is due to displacement of pan 212 from the weight to be measured in that pan.

A processor 250 is responsive to the signal on line 244a to provide an output signal on line 250a. The latter signal is representative of the weight of the object on the weighing pan 212.

By way of example, the elements in system 210 may be of the same form as those correspondingly numbered elements described in the incorporated reference U.S. patent application Ser. No. 265,088.

Figure 2:
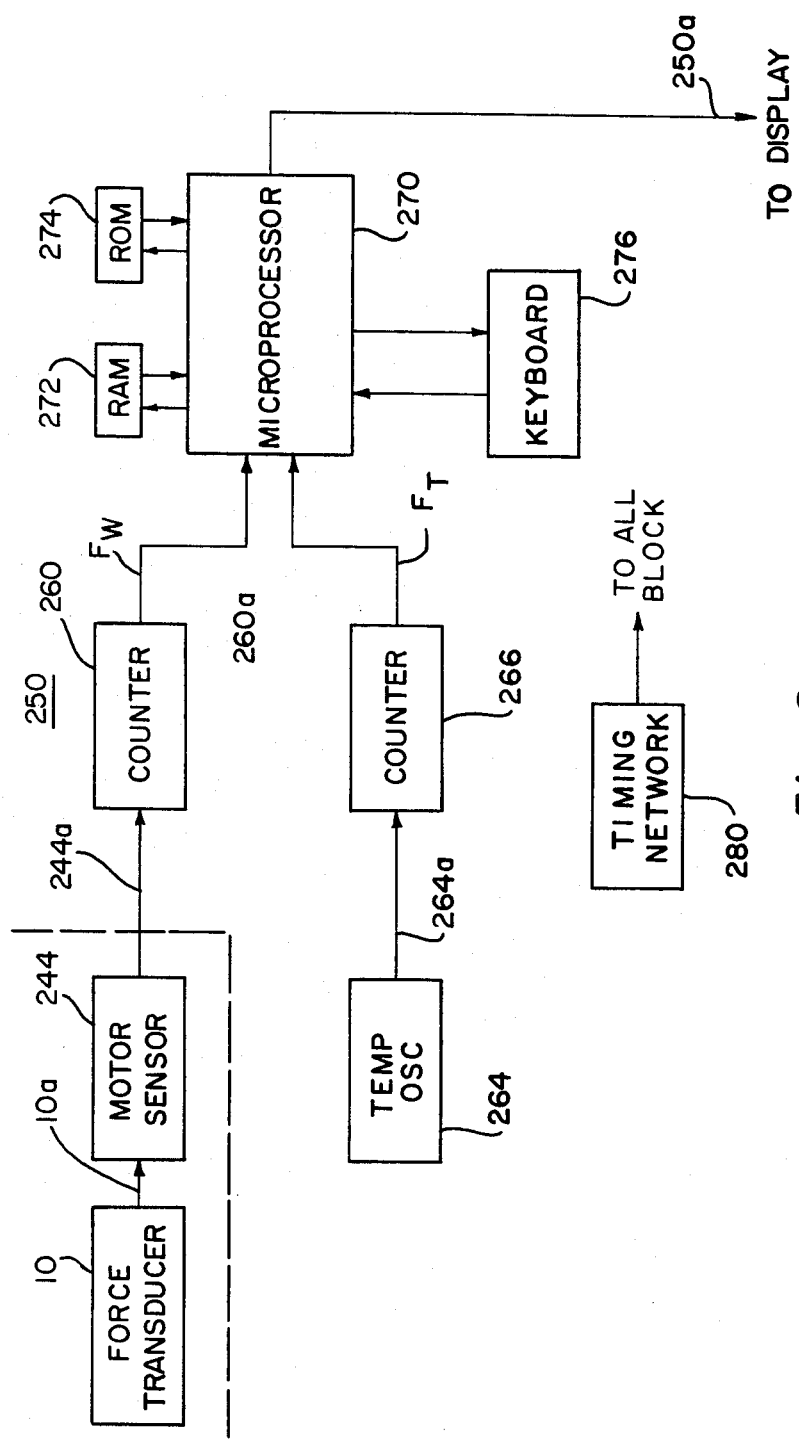
FIG. 2 shows in block diagram form the processor of the system of FIG. 1.

FIG. 2 shows the processor 250 of system 210 in block diagram form. The processor 250 includes a first (or weight) oscillator which provides a signal on line 244a which has a frequency representative of the detected force applied by a weight on pan 212. The height oscillator includes the force transducer 10 and position sensor 244 as described in the incorporated reference. The signal on line 244a is coupled to a counter 260 which provides a digital count signals $F_W$ on line 260a ($F_W$), which are representative of the frequency of the signal on line 244a.

A temperature sensor 264 provides an oscillatory signal on line 264a in which the frequency of the signal on that line is representative of the temperature of the system 210. The signal on line 264a is coupled to a counter 266 which provides digital count signals ($F_T$) on line 266a which are representative of the frequency of the signal on line 264a. Lines 260a and 266a are applied to a microprocessor 270.

Microprocessor 270 includes an associated random access memory (RAM) 272 and a read only memory (ROM) 274, and an input/output keyboard 276. Microprocessor 270 also provides an output signal on line 250a suitable for driving a conventional display. A timing network 280 provides timing control signals to the blocks in processor 250.

In one form of the invention, the microprocessor may be a Mostek Type 38P70/02, ROM 274 is a Hitachi type HM462532, and a RAM 272 is an NCR type 2055.

In operation, the signals on line 244a and 264a are characterized by frequencies representative of the weight of an object on a pan and the temperature of system 210, respectively. The counters 260 and 266 are controlled by the timing network 280 in order to act as window counters providing digital counts representative of the frequencies of the signals on line 244a and 264a ($F_W$ and $F_T$).

The memory 272 stores constants $K_{ij}$ representative of a temperature-compensated force function W(F,T). The function W(F,T) is defined as $$W(F,T) = \sum_{i=1}^{m} a_i(T) F^{i-1} \quad (*)$$

where F is a function of the uncompensated force produced by an object and T is representative of the temperature of the weighing system 210. In this definition, $$a_i(T) = \sum_{j=1}^{n} K_{ij} T^{j-1} \quad i = 1, 2, \ldots, m \quad (**)$$

where $K_{ij}$ are constants. In the present embodiment, m=4 and n=3. The values $F_W$ and $F_T$ may be used in conjunction with a signal corresponding to function W(F,T) evaluated at an input force F corresponding to $F_W$ and at a temperature T corresponding to $F_T$ to provide a temperature-compensated value representative of the weight of an object on the pan 212.

The present embodiment may also be used in a calibration mode to generate and store data representative of force (*) in memory 272. To perform this calibration procedure with the present embodiment, a succession of four known weights are deposited on the pan 212 at each of three temperatures. In other embodiments, different numbers of weights and temperatures may be used.

The processor 250 then in effect generates a set of twelve simultaneous equations based on W(F,T). Processor 250 solves these twelve simultaneous equations to provide signals representative of $a_1$ evaluated at temperatures $T_1$, $T_2$ and $T_3$, $a_2$ evaluated at temperatures $T_1$, $T_2$, and $T_3$, $a_3$ evaluated at $T_1$, $T_2$, and $T_3$, and $a_4$ evaluated at $T_1$, $T_2$, and $T_3$.

Processor 250 then uses these twelve resultant values for $a_i$ to solve a set of twelve simultaneous based on equations (**) for the twelve $K_{ij}$ values. Generally, the three values for $a_1$ at the temperatures $T_1$, $T_2$, and $T_3$, the values of $a_2$ at the three temperatures, the values for $a_3$ at the three temperatures and the values of $a_4$ at the three temperatures are used to determine $K_{ij}$, i=1, ..., 4, J=1, ..., 3.

Following the determination of these values for $K_{ij}$, the function W(F,T) is fully specified. Data representative of these values is stored in RAM 272.

OPERATION

In a general calibration mode, Processor 250 determines a "calibration surface" for the weighing system 210, where a weight value (W) is a function of the frequency of the oscillator of sensor 244 (F) for applied weights and the temperature of system 210 (T). This functional relationship W(F,T) describes the calibration surface for system 210. A succession of reference weights are placed on the weighting pan 212 at each of a number of temperatures. In response to the placement of the weights on the pan 212, the force on the pan from the weight are transferred to the force transducer 10, with the linkages 160 and 110 minimizing the effect of moments applied about axis 216 (such as might arise from off-center loading of the weight). The forces applied to the transducer 10 causes relative movements of the conductive surfaces of that transducer, resulting in a capacitance changes. Those capacitance changes cause a corresponding changes in the output frequency of the oscillator on line 244a. The processor then utilizes those values in the manner described above to fully define W(F,T) and then stores data representative of this function in RAM 272.

In the weight measuring mode, in response to the placement of the weight-to-be-measured on the pan 212, the processor 250 utilizes those signals (on line 244a) in conjunction with the signal from the temperature oscillator 264 (on line 264a) to identify the value of the function W(F,T) at the corresponding values for F and T. That value of W(F,T) is converted to a signal representative of the weight on the pan 212 at the current temperature of the system 210.

Figure 3:
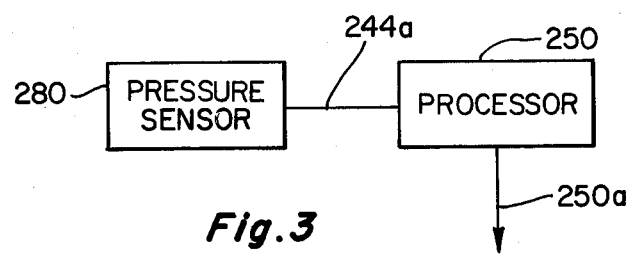
FIG. 3 shows in block diagram form a pressure measuring system embodying the present invention.

FIG. 3 shows in block diagram form, a pressure measuring system 278 which includes a pressure sensor 280 and processor 250. In the preferred form, pressure sensor 280 is an oscillator which includes a capacitive pressure transducer (such as the model 270, manufactured by Setra Systems, Inc., having a deformable diaphragm) as the sensing element. In general the system 280 operates in a manner substantially the same as the configuration of FIG. 1, except that sensor 280 provides an oscillatory signal characterized by a frequency which is a function of the input pressure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A digital scale with a temperature compensation system, comprising:
    a scale mechanism,
    first transducer means for sensing the force on the scale mechanism due to the presence of an object to be weighed and for generating digital force signals indicative thereof,
    second transducer means adjacent said scale mechanism for sensing the current ambient temperature and for generating digital temperature signals indicative thereof,
    means for generating a series of data indicative of n predetermined discrete ambient temperatures within an operating range,
    a set of data indicative of m known weights, where m and n are integers,
    means for applying said weights to the scale mechanism in a predetermined sequence at each of said ambient temperatures,
    data storage means for storing the digital force values obtained with each known weight at each discrete temperature, along with the corresponding digital temperature signal value,
    computer means for obtaining the calibration constants for said scale by using the known weights as the values of W and the corresponding stored digital force values as the values of F to evaluate the expression $$W = \sum_{i=1}^{m} a_i(T)F^{i-1},$$

at each temperature and solving the resulting n sets of m simultaneous equations for each of the coefficient terms $a_1(T), a_2(T) \ldots a_m(T)$, and then substituting the numerical values of the coefficient terms for each $a_i(T)$ in the set of expressions $$a_i(T) = \sum_{j=1}^{n} k_{ij}T^{j-1}$$
$$i = 1, \ldots, m,$$

where $k_{ij}$ are the calibration constants, and substituting the stored corresponding digital temperature signal values for T, and solving each of the resulting m sets of n simultaneous equations for each $k_{ij}$,
    said data storage means having means for storing the computer $k_{ij}$ values as a set of m×n calibration constants,
    means for computing a numerical value indicative of the corrected weight of an unknown object using the formula $$\sum_{i=1}^{m} a_i(T)F^{i-1}$$

by employing the stored calibration constants which are the computer polynomial coefficients within each $a_i(T)$ expression, and
    means for generating an output signal based on the said computer numerical value representing the corrected weight of the object on the scale mechanism
    whereby the effect of temperature change on the scale mechanism, transducer means and other electrical components of the scale is taken into account.

2. The system of claim 1, wherein m is 4 and n is 3.

3. A temperature compensation method for a digital scale having a scale mechanism force transducer means producing digital force signals representative of the force on the scale mechanism due to an object to be weighed, comprising the steps of
    (a) generating a digital temperature signal representative of the current ambient temperature,
    (b) in a calibration mode, applying a predetermined series of m known weights to said scale mechanism at a first discrete fixed ambient temperature in the nominal operating temperature range of the scale,
    (c) recording the values of the digital force signal and digital temperature signal,
    (d) changing the ambient temperature to subject said scale to a predetermined sequence of n discrete temperatures in its operating range, each time repeating steps a and b, to obtain a set of m×n stored digital force and temperature values, m and n being integers, (e) using the known weights as the values of W and the corresponding stored digital force values as the values of F to evaluate the expression $$W = \sum_{i=1}^{m} a_i(T)F^{i-1},$$

at each temperature and solving the resulting n sets of m simultaneous equations for each of the coefficient terms $a_1(T), a_2(T), \ldots a_m(T)$, (f) substituting the numerical values of the coefficient terms for each $a_i(T)$ in the set of expressions $$a_i(T) = \sum_{j=1}^{n} k_{ij}T^{j-1}$$

$i = 1, \ldots, m,$ where $k_{ij}$ are the calibration constants, and substituting the stored corresponding digital temperature signal values for T, and solving each of the resulting m groups of n simultaneous equations for each $k_{ij}$, (g) storing the computer $K_{ij}$ values as a set of $n \times m$ calibration constants, (h) in the post calibration measurement mode, to weigh a given object of unknown weight, computing a numerical value indicative of the corrected weight for the unknown object using the formula $$\sum_{i=1}^{m} a_i(T)F^{i-1}$$

by employing the stored calibration constants which are the computer polynomial coefficients within each $a_i(T)$ expression, and (i) generating an output signal based on the said computer numerical value representing the corrected weight of the object on the scale, whereby the effect on the scale mechanism, transducer and associated electronics of variations in ambient temperature is taken into account.

4. The method of claim 3, wherein m is 4 and n is 3.

* * * * *

UNITED STATES PATENT AND TRADEMARK OFFICE
CERTIFICATE OF CORRECTION

PATENT NO. : 4,464,725

DATED : August 7, 1984

INVENTOR(S) : Dennis K. Briefer

It is certified that error appears in the above-identified patent and that said Letters Patent is hereby corrected as shown below:

Page 1 at [63], "265,088" should be --265,086--;

Column 1, lines 6-7, "The subject matter of this application is a continuation of U.S. patent application Ser. No. 265,088, Weigh-" should be --The subject matter of this application is related to that of U.S. patent application Ser. No. 265,088, Weigh---;

Column 8, lines 16-17, "computer" should be --computed--.

Signed and Sealed this

Third Day of June 1986

[SEAL]

Attest:

DONALD J. QUIGG

Attesting Officer

Commissioner of Patents and Trademarks